US008135966B2

(12) United States Patent  
Rozen et al.

(10) Patent No.: US 8,135,966 B2
(45) Date of Patent: Mar. 13, 2012

(54) METHOD AND DEVICE FOR POWER MANAGEMENT

(75) Inventors: Anton Rozen, Gedera (IL); Michael Priel, Hertzelia (IL); Leonid Smolyansky, Akiva (IL)

(73) Assignee: Freescale Semiconductor, Inc., Austin, TX (US)

( * ) Notice: Subject to any disclaimer, the term of this patent is extended or adjusted under 35 U.S.C. 154(b) by 528 days.

(21) Appl. No.: 12/304,854

(22) PCT Filed: Jun. 22, 2006

(86) PCT No.: PCT/IB2006/052033
§ 371 (c)(1),
(2), (4) Date: Dec. 15, 2008

(87) PCT Pub. No.: WO2007/148159
PCT Pub. Date: Dec. 27, 2007

(65) Prior Publication Data
US 2009/0177903 A1    Jul. 9, 2009

(51) Int. Cl.
*G06F 1/32* (2006.01)
(52) U.S. Cl. .......................... 713/300; 713/310; 713/320
(58) Field of Classification Search .................. 713/300, 713/310, 320
See application file for complete search history.

(56) References Cited

U.S. PATENT DOCUMENTS

| 5,301,306 | A | 4/1994 | Plog |
| 6,079,025 | A | 6/2000 | Fung |
| 6,515,530 | B1 | 2/2003 | Boerstler et al. |
| 6,574,739 | B1 | 6/2003 | Kung et al. |
| 6,584,571 | B1 | 6/2003 | Fung |
| 7,634,668 | B2 * | 12/2009 | White et al. ............... 713/300 |
| 2002/0042887 | A1 | 4/2002 | Chauvel et al. |
| 2002/0099964 | A1 | 7/2002 | Zdravkovic |
| 2008/0162965 | A1 * | 7/2008 | Marinas et al. ............ 713/320 |
| 2009/0083564 | A1 * | 3/2009 | Kano ...................... 713/330 |
| 2009/0144572 | A1 * | 6/2009 | Rozen et al. .............. 713/322 |
| 2010/0131787 | A1 * | 5/2010 | White et al. ............... 713/322 |

FOREIGN PATENT DOCUMENTS

| EP | 0631220 A2 | 12/1994 |
| WO | 2006056824 A2 | 10/2004 |

OTHER PUBLICATIONS

International Search Report and Written Opinion correlating to PCT/IB2006/052033, dated May 16, 2007.

* cited by examiner

*Primary Examiner* — Nitin C. Patel
*Assistant Examiner* — Zahid Choudhury

(57) ABSTRACT

A device and method for power management. The method includes receiving an indication about a load of a circuit, determining at least one long-term activation parameter in view of a circuit load pattern during at least one long period; determining at least one short-term activation parameter in response to an expected short period load change of the circuit; and providing least one clock signal and at least one supply voltage in response to the long-term activation parameter and in response to the short-term supply parameter.

18 Claims, 5 Drawing Sheets

METHOD AND DEVICE FOR POWER MANAGEMENT

FIELD OF THE INVENTION

The invention relates to methods and devices for power management.

BACKGROUND OF THE INVENTION

Mobile devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

In order to reduce the power consumption of mobile devices various power consumption control techniques were suggested. A first technique includes reducing the clock frequency of the mobile device. A second technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption. Devices have various components that include peripherals, processors and other components that can operate in few frequencies. DVS can provide at any given point in time a clock signal having a certain frequency out of these few frequencies.

By applying DVS techniques, when the load of a system decreases the voltage/frequency can be decreased thus reducing the power consumption. Nevertheless the reduction of voltage/frequency shall take into account the load fluctuations of the system. For example, if a load decrement is followed by an immediate load increment fast voltage supply fluctuations can amount in a large energy loss due to re-charge of parasitic and/or decoupling capacitors.

Various DVS systems and method are provided at U.S. Pat. No. 6,584,571 of Fung, titled "system and method of computer operating mode clock control for power consumption reduction", U.S. Pat. No. 6,079,025 of Fung titled "system and method of computer operating mode control for power consumption reduction", U.S. patent application 20020042887 of Chauvel et al., titled "Dynamic hardware configuration for energy management systems using task attributes", U.S. patent application 6515530 of titled "Dynamically scalable low voltage clock generation system" of Boerstler et al., all being incorporated herein by reference.

There is a need to provide an efficient manner to decrease and increase voltage/frequency provided to a system.

SUMMARY OF THE PRESENT INVENTION

A method and device for power management, as described in the accompanying claims.

BRIEF DESCRIPTION OF THE DRAWINGS

The present invention will be understood and appreciated more fully from the following detailed description of embodiments thereof taken in conjunction with the accompanying drawings in which.

DETAILED DESCRIPTION OF THE DRAWINGS

Figure 1:
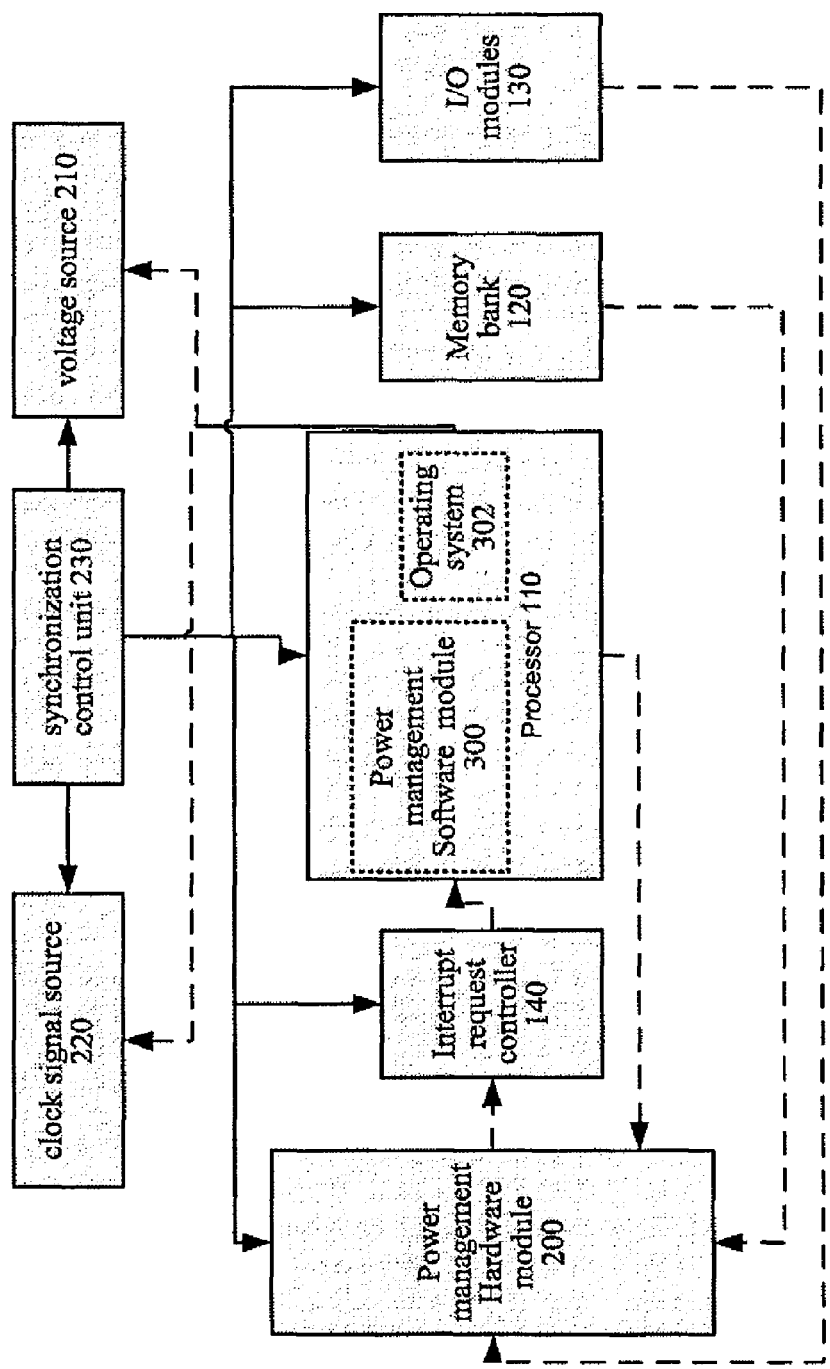
FIG. 1 illustrates a device according to an embodiment of the invention.

When appropriate, like reference numerals and characters may designate identical, corresponding or similar components in differing drawings.

According to various embodiments illustrated in the following drawings power management devices and methods are provided. The devices and method use short-term voltage and frequency adjustments as well as long-term voltage and frequency adjustments.

The response period of a DVS system to load changes has to be slow enough in order to prevent unnecessary voltage/frequency increments. Gaining more information about the load of the system eventually smoothes the voltage/frequency provided to the device.

On the other hand, when the load of system increases, the voltage/frequency must be increased relatively fast in order to prevent performance penalties that are especially critical when the system executes a real time program such as a video-processing program.

According to an embodiment of the invention both long-term and short-term power management schemes are applied. The long-term power management scheme determines a first voltage/frequency pattern that is characterized by a relatively long periods between voltage/frequency changes. The long-term power management scheme can average the load during relatively long periods, thus can benefit from device load information gained over long periods. The short-term power management scheme takes into account the first voltage/frequency pattern but can modify, during short periods, the first voltage/frequency pattern, in response to expected system tasks.

Accordingly, the short-term power management scheme can be synchronized to various tasks and can provide additional voltage/frequency that is required for completing these tasks in a reasonable time frame.

The following description related to a system that includes a single frequency region. It is noted that this can be applied to a system that includes multiple frequency regions. Typically, multiple frequency regions require separate control for each frequency region.

The following description refers to a hybrid power management entity that includes a hardware and software modules. According to other embodiments of the invention the power management entity can include only software modules or only hardware modules, or by a combination of hardware and software modules that in which the partition between hardware and software executed tasks differs from the mentioned below partition. Furthermore, according to other embodiments of the invention the apparatus executing the voltage/frequency control schemes may apply different long-term and/or short-term power management policies.

The inventors defined long periods of tenths millisecond, hundreds milliseconds and more while defining short periods that were shorter than one millisecond. It is noted that other periods can be defined.

FIG. 1 is a schematic illustration of a system 100 that includes multiple components such as processor 110, memory bank 120, I/O modules 130, interrupt request controller 140, clock signal source 220, voltage source 210, synchronization control unit 230. System 100 also includes a hardware module 200. Conveniently, processor 110 executes a software module 300 that with the hardware module 200 forms power management apparatus 232 (also referred to as apparatus 232).

The power management includes determining activation parameters (also referred to as supply parameters or power supply parameters) such as timing of voltage alterations, amount of voltage alteration, and the like. Long-term activation parameters are imposed during long periods while short-term activation parameters are imposed during short periods.

System 100 has power management capabilities, and power management apparatus 232 that is adapted to receive an indication about a load of a circuit, determine at least one long-term activation parameter in view of a circuit load pattern during a long period; determine at least one short-term activation parameter in response to an expected short period load change of the circuit; and to determine, in response to the long-term activation parameter and in response to the short-term supply parameter, a clock signal frequency and a supply voltage level (collectively referred to as voltage/frequency or frequency/voltage) provided by clock signal source 220 and by the voltage source 210.

It is noted that system 100 can have various configurations and that the components illustrated in FIG. 1 represent only a single exemplary configuration of system 100. Typically system 100 is included within a mobile device such as a cellular phone.

The hardware module 200 is adapted to receive one or more activity related signals representative of an activity of at least one component of the system 100 and in response to determine whether to perform long-term alterations of the voltage/frequency provided to the components of system 100. Such signals may include, for example, memory access signals (read/write), cache hit/miss signals, bus related signals, processor IDLE signal, various processor instructions, interrupt requests, I/O access, and the like. It is noted that the hardware module 200 can be operated such as to determine the activation parameters of a frequency domain that does not include a processor but other components such as but not limited to peripherals. In this case peripheral located indication signals are monitored.

Alternatively or additionally hardware module 200 can also determine weather to perform short-term alterations of the voltage/frequency provided to the components of system 100.

Apparatus 232 is capable of determining long-term and short-term alterations of the supply voltage and clock signal frequency supplied to system 100 (said characteristic pair is referred to as voltage/frequency) under various timing constraints that include, for example: the decision period of apparatus 232, voltage supply and clock signal supply stabilization period, and system's 100 and especially processor's 110 load change rate.

Apparatus 232 can apply a long-term policy for incrementing the voltage/frequency and another long-term policy for decrementing the voltage/frequency supplied to system 100 or any circuit of system 100 (including, for example processor 110). It is noted that apparatus 232 can apply substantially the same long-term policy for incrementing and decrementing the voltage/frequency supplied to system 100 or any circuit of system 100. If different long-term policies are applied they can be implemented by setting different average load thresholds to various load related events.

It is noted that although FIG. 1 illustrates a system 100 that includes a processor, systems (or frequency regions) that do not include processors but rather other components (such as peripherals) can be load monitored and accordingly supplied with the appropriate voltage/frequency. It is further noted that the load that is taken into account when applying a power management scheme can be responsive to the load of one, multiple or all components within the frequency region.

It is noted that by applying long-term and short-term patterns the average clock signal frequency provided to the frequency region can deviate from the few frequencies that can be supplied by the clock source.

It is further noted that the long-term and/or the short-term voltage/frequency patterns can include more than two frequency/voltage levels. It is further noted that a short-term voltage/frequency pattern can include voltage/frequency increments as well as voltage/frequency decrements.

Conveniently, if certain tasks associated with load changes are repetitive tasks then at least the short-term voltage/frequency pattern can include repetitive voltage/frequency alterations that correspond to the timing of the repetitive tasks.

Figure 2:
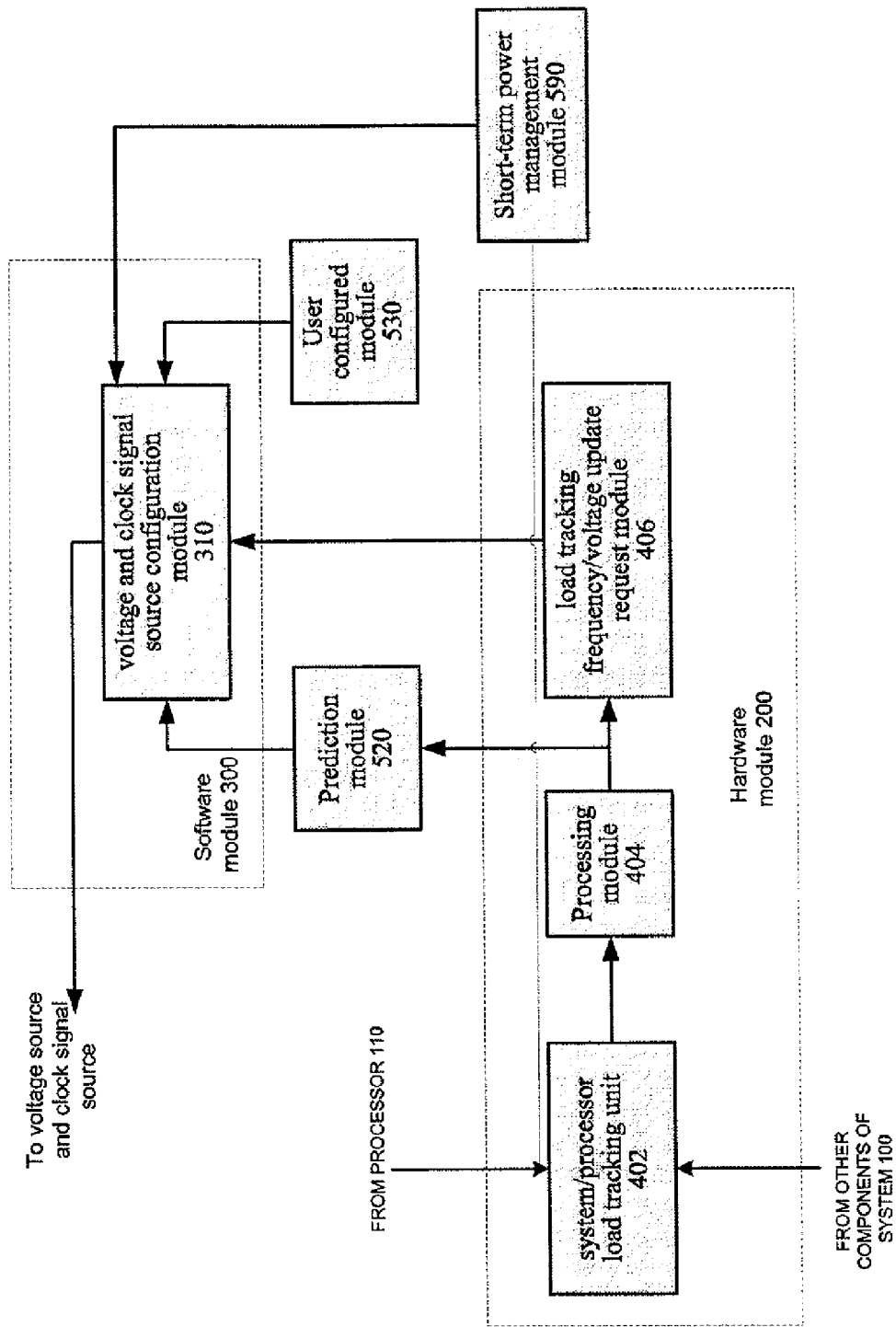
FIG. 2 illustrates an apparatus, according to an embodiment of the invention.

FIG. 2 illustrates apparatus 232, according to an embodiment of the invention.

Apparatus 232 include short-term power management module 590 that defines a short-term power management policy. Other components of apparatus 232 define a long-term power management policy.

Short-term power management module 590 can include software components, hardware components or a combination of both. It can be connected to interfacing module 490 of FIG. 3, to software module 300 but this is not necessarily so.

Short-term power management module 590 can define fast voltage/frequency alteration points in response to expected tasks of system 100, especially in response to relatively high load tasks that their timing is known in advance (for example—cyclic tasks such as processing video frames).

Conveniently, the various tasks associated with controlling and providing voltage and clock signals to system 100 were divided between the hardware module 200 and the software module 300 of apparatus 232. The hardware module 200 receives one or usually multiple activity related signals, applies a load tracking algorithm such as but not limited to the exponential moving average (EMA) algorithm and determine when to alter the voltage/frequency supplied to system 100.

Hardware module 200 and especially short-term power management module 590 can receive a signal indicating that a task is going to be executed (for example a frame processing task is being requested from processor 110) and in turn can request a fast voltage/frequency change.

The software module 300 configures the voltage source 210 and the clock signal source 220.

Optionally, the apparatus 232 includes a prediction module 520 that predicts how to alter the voltage/frequency in response to previous exponential moving average load estimates. The hardware module 200 includes programmable components thus allowing alterations of the decision process.

The control of the voltage source 210 and clock signal source 220 is relatively simple and does not load the processor 110. Furthermore, its simplicity allows components having limited processing capabilities, such as DMA modules and simple controllers, to execute the voltage and clock signal source configuration module 310. In addition, various existing processors have the capability of setting voltage and clock signal frequency, thus utilizing this capability further increases the efficiency of apparatus 232 and system 100 as a whole.

The apparatus 232 samples the activity related signals by the clock signal CLK supplied to the system or by a clock signal having a lower frequency, such as CLK_3 (or other clock) that is a derivative of CLK.

System 100 receives a supply voltage V(t) as well as a clock signal CLK of a certain frequency F(t) from a synchronization control unit 230 that synchronizes the levels of V(t) and F(t) such as to prevent, for example, a case in which the supplied voltage V(t) does not allow the system 100 to operate at a the frequency F(t) of the clock signal. The synchronization control unit 230 is connected to a clock signal source 220 for receiving the clock signal and is also connected to a voltage source 210 for receiving the supply voltage. Conveniently, the clock signal source 220 includes two phase locked loops, whereas while one is supplying a current clock signal of a current frequency the other can be tuned to supply the next clock signal having a next frequency. The voltage source can also include two voltage sources but this is not necessarily so.

Apparatus 232 includes various long-term power management components such as a hardware module 200 that includes a system/processor load tracking unit 402, a processing module 404 and a load tracking frequency/voltage update request module 406. The software module 300 includes a voltage and clock signal source configuration module 310. FIG. 2 also illustrates two optional modules such as prediction module 520 and user configures module 530, each can be a hardware module, a software module or a combination of both hardware and software.

The voltage and clock signal source configuration module 310 is capable of configuring the clock signal source 220 as well as the voltage source 210 by various prior art methods, such as writing control values to registers accessed by these sources, or signal asserting.

The voltage and clock signal source configuration module 310 is capable of receiving a requests to alter the voltage/frequency from load tracking frequency/voltage update request module 406 and to convert the request to a format that can be understood by and accessible to the clock signal source 220 as well as the voltage source 210.

Conveniently, the voltage and clock signal source configuration module 310 receives also a request to alter the voltage/frequency from a prediction module 520. According to another embodiment of the invention the voltage and clock signal source configuration module 310 is also adapted to receive requests from a user-configured module 530.

When requests can be provided to the voltage and clock signal source configuration module 310 from more that a single module it may apply various decision processes to decide how to alter the voltage/frequency. Each request can be assigned with a certain priority and/or weight and any combination of at least one of the requests can be applied. For example, a request of the prediction module 520 can override a request of the load tracking frequency/voltage update request module 406, and a request from the user-configured module 530 can override both.

System/processor load tracking unit 402 receives multiple activity related signal and is capable of assigning a predefined weight to each signal. Conveniently, the system/processor load tracking unit 402 tracks the activity of the processor 100 by monitoring at least one signal such as an IDLE/BUSY signal and also is also capable of tracking the activity of other components of system.

System/processor load tracking module 402 provides an indication of the activities of various components to a processing module 404 that outputs a load indication and an exponential moving average load estimate to the load tracking frequency/voltage update request module 406 and also provides the exponential moving average load estimate to the prediction module 520.

Figure 3:
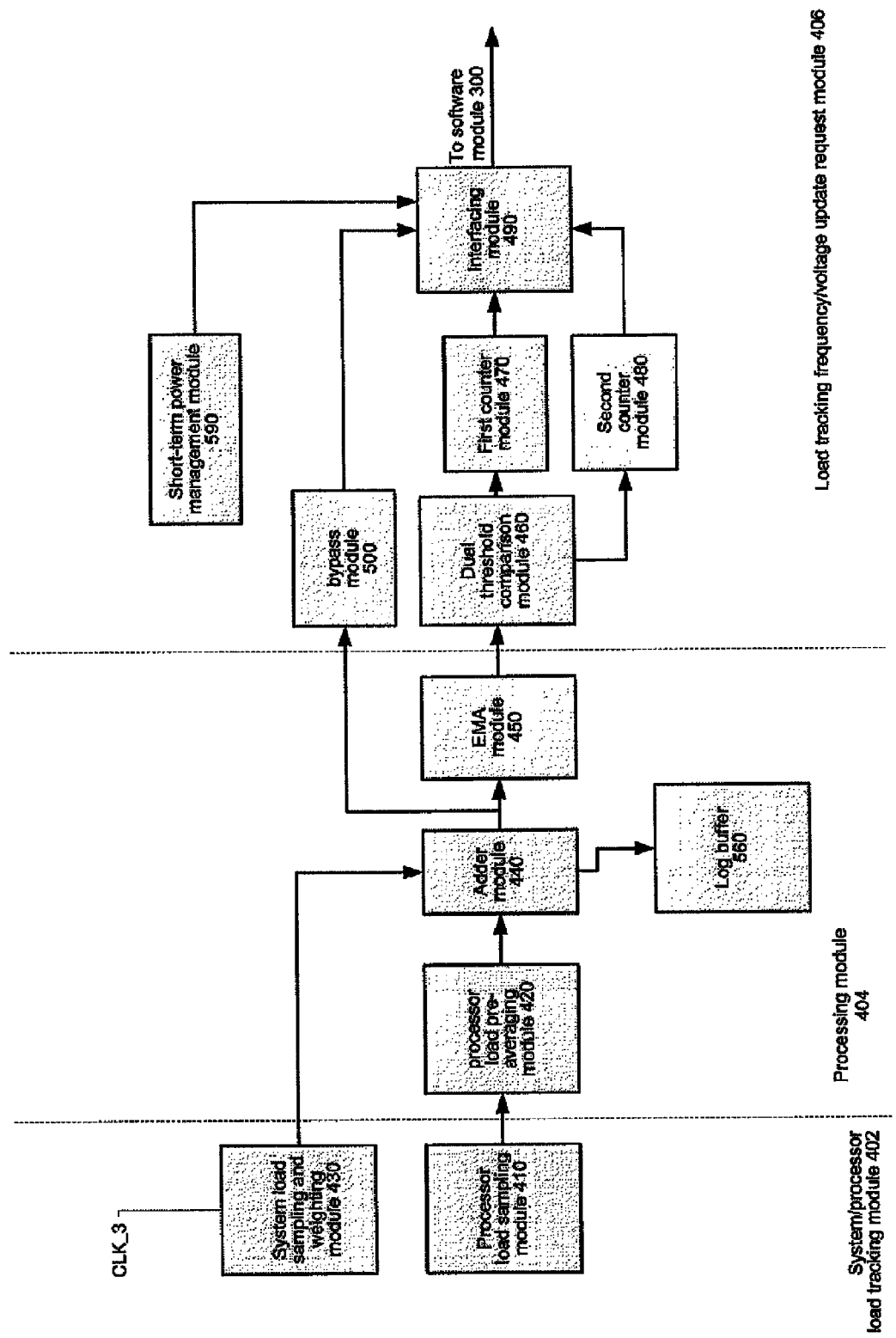
FIG. 3 is a schematic diagram of various modules of the apparatus of FIG. 2, according to an embodiment of the invention.

FIG. 3 is a schematic diagram of various modules 402-406 of the apparatus 232, according to an embodiment of the invention.

System/processor load tracking module 402 includes modules 410 and 430. Processor load sampling module 410 samples the IDLE or NON-IDLE (BUSY) signal of processor 110. The IDLE or NON-IDLE (BUSY) signal is sampled by CLK and creates IDLE' sampled signal. These IDLE' sampled signal is provided to a processor load pre-averaging module 420 that belongs to processing module 404. The processor load pre-averaging module 420 calculates a ratio R between the amounts of clock signals (CLK) during a certain averaging period and between the amount of sampled signal IDLE' provided by processor load sampling module 410 during that certain averaging period. The length of the averaging period is programmable. Conveniently, either module 410 or module 420 can multiple either IDLE' or R by a programmable weight W_IDLE. Conveniently, the averaging periods do not overlap, but this is not necessarily so.

Conveniently, processor load pre-averaging module 420 also divides CLK to generate a slower clock signal CLK_3 that is provided to various modules such as modules 430 and 440-590.

System load sampling and weighting module 430 receives multiple activity related signals from other components of system 100, although it can also receive one or more signals (other than IDLE) from processor 110. The system load sampling and weighting module 430 samples the received signals by CLK_3 and multiplies each sampled activity related signal by a corresponding programmable weight to provide multiple weighted system activity related signals SL_1-SL_K.

R is also provided to a log buffer 560, and conveniently said log buffer 560 can also receive at least one of the load indication system load indication signals.

Processing module 404 includes modules 420, 440 and 450. Adder module 440 adds R to the multiple weighted system activity related signals SL_1-SL_K to provide a load indication LL(t).

The load indication LL(t) is provided to a bypass module 500 as well to a exponential moving average (EMA) module 450.

The EMA module 450 applies an exponential moving average module algorithm that is responsive to at least one programmable parameter $\alpha$. Basically, EMA performs the following equation: $EMA(t)=\alpha*LL(t)+(1-\alpha)*EMA(t-\Delta t)$, whereas EMA(t) is an exponential moving average load estimate, $\alpha=1/(W+1)$, W is a positive integer representative of an amount of samples that are taken into account within a programmable window and EMA(t-$\Delta$t) is a result of the previous iteration of an EMA calculation. Typically, $\Delta$t is responsive to CLK_3 and to an amount of clock cycles required for the calculation of EMA(t).

The inventors used an eight bit $\alpha$, but this is not necessarily so. When $\alpha$ is increased the current value of LL(t) is more dominant thus rapid changes of LL(t) can be tracked. When $\alpha$ is decreased previous samples are more relevant and a more stable tracking process is achieved.

Load tracking frequency/voltage update request module 406 includes modules 460-500. Dual threshold comparison module 460 receives exponential moving average load estimate EMA(t) and compares it in parallel to a upper average load threshold Lup and to a lower average load threshold Ldown. Both load thresholds are programmable. Higher Lup values lead to a slower voltage/frequency update process while lower Ldown values lead to faster or more frequent voltage/frequency update process.

Each time EMA(t) exceeds Lup the dual threshold comparison module 460 generates a EMA_higher_than_Lup signal. The EMA_higher_than_Lup signal is sent to a first counter module 470 that counts the amount of consecutive EMA_higher_than_Lup signals. The first counter module 470 generates a request to increase the voltage/frequency (Req_up(t)) if more than a programmable amount (N_up) of consequent EMA_higher_than_Lup signals were received.

Each time EMA(t) is below Ldown the dual threshold comparison module 460 generates a EMA_lower_than_Ldown signal. The EMA_lower_than_Ldown signal is sent to a second counter module 480 that counts the amount of consecutive EMA_lower_than_Ldown signals. The second counter module 480 generates a request to decrease the voltage/frequency (Req_down(t)) if more than a programmable amount (N_down) of consequent EMA_lower_than_Ldown signals were received.

According to an embodiment of the invention each policy is tailored to provide optimal performances, by setting appropriate thresholds. These thresholds may include one or more of the following: N_up, N_down, Lup and Ldown.

Req_up(t) and Req_down(t) signals are provided to interfacing logic 490 that sets various status bits, accessible by software module 300, to reflect a received request to alter voltage/frequency. Interfacing logic can also send a request to interrupt request controller 140 (or directly to processor 110) to initiate an interrupt request that enables processor 110 to execute voltage and clock signal source configuration of module 310. The voltage and clock signal source configuration module 310 converts requests to increase or decrease voltage/frequency to commands that control the clock signal source 220 and the voltage source 210 accordingly.

The bypass module 500 receives LL(t) and compares it to a predefined load threshold. If said load threshold is exceeded the bypass module 500 can send a request to increase the voltage/frequency to interfacing logic 490, regardless of the output of modules 450-480. The bypass module 500 allows the apparatus 232 to respond quickly to sudden system overload situations.

The prediction module 520 can predict power consumption based upon previously stored load indications, for example the load indications stored at the log buffer 560.

According to other embodiments of the invention the prediction module 520 can response to instructions being executed by processor 100 or other module. For example, it may predict the load when processor 110 executes loops, by monitoring various commands, flow changes an/or loop commands fetched by processor 110. The prediction module 520 can include software components, hardware components or a combination of both.

According to an embodiment of the invention the programmable values provided to the apparatus 232 can be responsive to previously provided values and even to the tasks that are executes by system 100 and especially processor 110. For example, when system 100 mainly processes video the system 100 and especially processor 110 can load a first set of programmable values to the apparatus 232, while when executing other tasks, another set of programmable values can be loaded. The programmable values can be also programmed in response to previous voltage/frequency alterations. For example very frequent voltage/frequency alterations can indicate that a slower tracking process is required and vice verse. The programmable values can also be responsive to other parameters such as operating conditions (such as temperature, battery level) of system 100 and the like.

Figure 4:
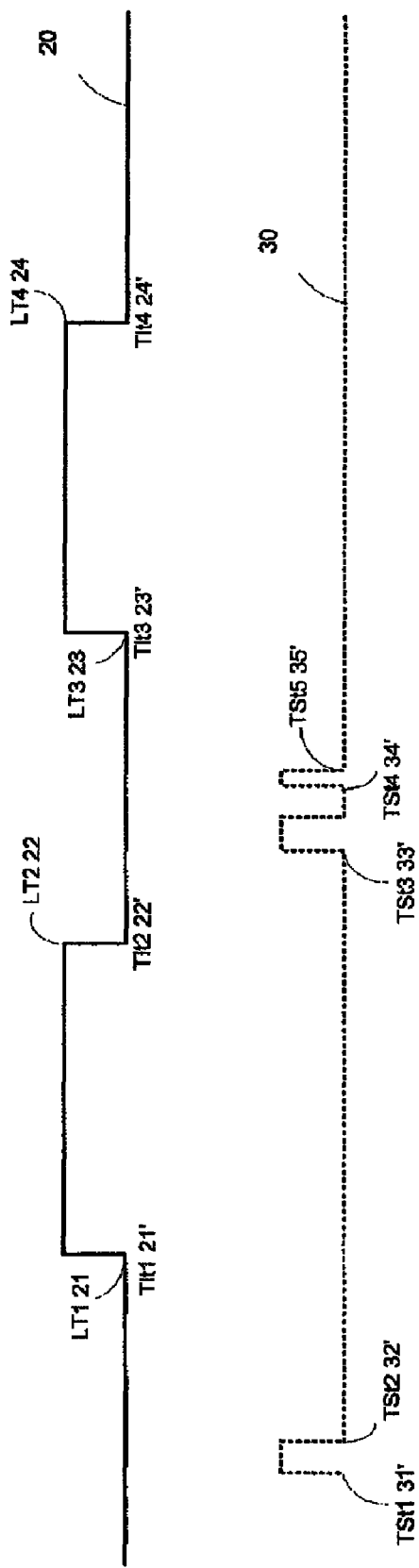
FIG. 4 illustrates exemplary voltage patterns, according to an embodiment of the invention.

FIG. 4 illustrates exemplary voltage patterns, according to an embodiment of the invention.

Curve 20 illustrates a first voltage/frequency pattern that is characterized by a relatively long periods between voltage/frequency changes. This frequency/voltage pattern is determined by applying a long-term power management scheme. It can be determined, for examples by a combination of processing module 403 and load tracking frequency/voltage update request module 406. The first voltage/frequency pattern includes four exemplary voltage/frequency alteration points that delimit the long periods and during which the voltage level and clock signals frequency are altered. These points include LT1-LT4 21-24 that occur at times Tlt1-Tlt4 21'-24'. Conveniently, the frequency/voltage alteration at point in time Tlt1 21' reflects the load measured during initialization time T0 till Tlt1 21'.

Curve 30 illustrates a second voltage/frequency pattern that is responsive to the first voltage/frequency pattern but is further responsive to expected tasks that may require short deviations from the first voltage/frequency pattern. For simplicity of explanation it is assumed that a first task requires an increased voltage/frequency provision during a short period that starts at Tst1 31' and ends at Tst2 32'. Yet another task requires a short-term alteration of voltage at Tst3 33' and may end at Tst4 34', but the completion time is not definite. Accordingly, the short-term power management scheme can define a first short-term voltage/frequency alteration point at about Tst1 (which will be a short-term voltage/frequency increment point) 31, a second short-term voltage/frequency alteration point at about Tst2 (which will be a short-term voltage/frequency decrement point) 32, a third short-term voltage/frequency alteration point at about Tst3 (which will be a short-term voltage/frequency increment point) 33, a conditional short-term voltage/frequency alteration point at about Tst4 34 and optionally another short-term voltage/frequency alteration point at Tst5 (which will be a short-term voltage/frequency decrement point) 35 during which the voltage/frequency will be decremented if it was not decremented in the conditional short-term voltage/frequency alteration point at about Tst4 34.

It is noted that the second voltage/frequency pattern can be determined regardless of the first voltage/frequency pattern and both frequency/patterns are then added (superimposed) to each other to provide the required voltage/frequency pattern.

It is further noted that the second voltage/frequency pattern cause a temporal reduction in the voltage/frequency provided (in comparison to the voltage/frequency provided by the first voltage/frequency pattern).

Figure 5:
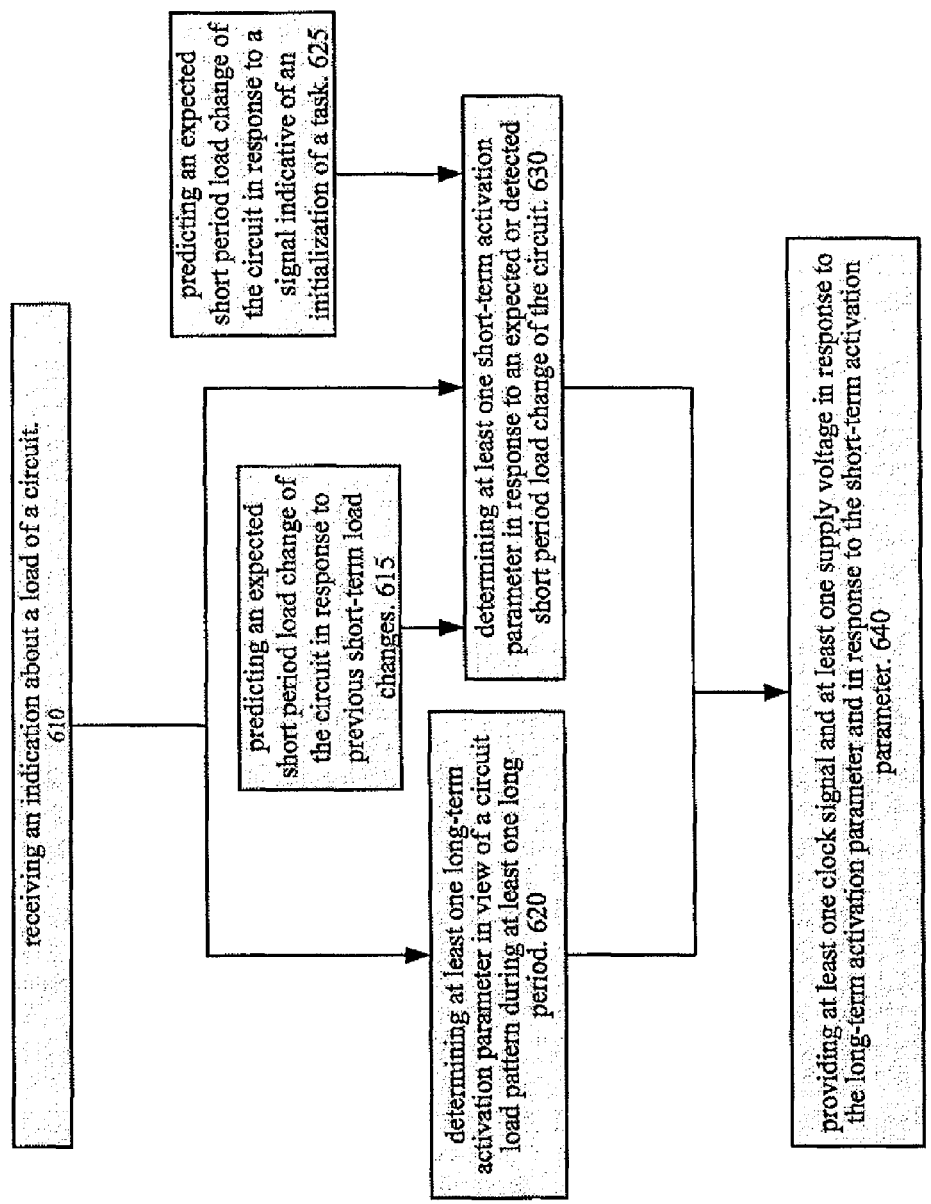
FIG. 5 illustrates a method according to an embodiment of the invention.

FIG. 5 is a flow chart of a method 600 for controlling voltage level and clock signal frequency supplied to a system.

Method 600 starts by stage 610 of receiving an indication about a load of a circuit.

Stage 610 is followed by stages 620 and 630. Stage 620 includes determining at least one long-term activation parameter in view of a circuit load pattern during at least one long period. This stage can include defining a first voltage/frequency pattern by components such as hardware components 402 and 404. This at least one long-term activation parameter can include timing of voltage alterations, amount of voltage alteration, and the like. It is noted that the circuit load pattern during the long period can represent previous load levels/variations and optionally expected long-term load variations.

Stage 630 includes determining at least one short-term activation parameter in response to an expected or detected short period load change of the circuit. This at least one short-term activation parameter can include timing of voltage alterations, amount of voltage alteration, a conditional voltage definition and the like.

This stage can include defining a second voltage/frequency pattern by components such as short-term power management component 590.

Conveniently, stage 630 includes determining a short-term voltage/frequency alteration point and determining a conditional voltage/frequency alteration point in which a voltage/frequency alteration is responsive to a load of the circuit at substantially the conditional voltage/frequency alteration point.

Conveniently, stage 630 includes determining a short-term voltage/frequency alteration point in synchronization with an expected short-term circuit load increment.

Conveniently, stage 630 includes determining multiple short-term voltage/frequency alteration points during a short-term that corresponds to an expected execution period of a task.

Conveniently, stage 630 includes determining a short-term voltage/frequency increment point and a voltage/frequency decrement point during a short-term that corresponds to an execution period of a task.

Conveniently, stage 630 includes determining multiple short-term voltage/frequency alteration points and at least one conditional voltage/frequency alteration point during a short-term that corresponds to an expected execution period of a task.

Stages 620 and 630 are followed by stage 640 of providing at least one clock signal and at least one supply voltage in response to the long-term activation parameter and in response to the short-term supply parameter.

Conveniently, the long period is at least ten times longer than the short period, but this is not necessarily so. For example the ratio between these periods can be between three and ten or even below three.

Conveniently, stage 630 can be preceded by optional stage 625 of predicting an expected short period load change of the circuit in response to a signal indicative of an initialization of a task.

Conveniently, stage 630 can be preceded by optional stage 615 of predicting an expected short period load change of the circuit in response to previous short-term load changes.

Conveniently stage 620 may include at least one of the following stages: (i) Assigning a weight to each activity related signal, (ii) Applying a first long-term policy for increasing the voltage level and clock signal frequency and by applying a second long-term policy for decreasing the voltage level and clock signal frequency. The first policy differs from the second policy, (iii) Storing load indications, and (iv) Estimating future load in response to the stored load indications.

Conveniently, stage 620 includes utilizing a hardware module and stage 640 includes controlling a clock source and a voltage supply by a software module.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for power management, the method comprise:
   receiving an indication about a load of a circuit;
   determining at least one long-term activation parameter in view of a circuit load pattern during at least one long period;
   determining at least one short-term activation parameter in response to an expected or detected short period load change of the circuit, wherein the at least one short-term activation parameter includes a short-term voltage/frequency increment point and a short-term voltage/frequency decrement point during a short-term that corresponds to an execution period of a task;
   providing at least one clock signal and at least one supply voltage in response to the long-term activation parameter and in response to the short-term supply parameter; and
   determining a short-term voltage/frequency alteration point and determining a conditional voltage/frequency alteration point in which a voltage/frequency alteration is responsive to the load of the circuit based on the conditional voltage/frequency alteration point.

2. The method according to claim 1 wherein the determining a short-term power parameter comprises determining the short-term voltage/frequency alteration point in synchronization with an expected short-term circuit load increment.

3. The method according to claim 1 wherein the determining comprises determining multiple short-term voltage/frequency alteration points during a short-term that corresponds to an expected execution period of the task.

4. The method according to claim 1 wherein the determining comprises determining multiple short-term voltage/frequency alteration points and at least one conditional voltage/frequency alteration point during a short-term that corresponds to an expected execution period of the task.

5. The method according to claim 1 wherein the at least one long period is at least ten times longer than the short period.

6. The method according to claim 1 wherein determining is preceded by predicting an expected short period load change of the circuit in response to a signal or, a command indicative of an initialization of the task.

7. The method according to claim 1 wherein determining is preceded by predicting an expected short period load change of the circuit in response to previous short-term load changes.

8. The method according to claim 1 wherein the determining comprises utilizing a hardware module and the providing comprising controlling a clock source and a voltage supply by a software module.

9. A system having power management capabilities, the system comprises:
   a clock signal source and a voltage source;
   a power management apparatus adapted to:
      receive an indication about a load of a circuit;
      determine at least one long-term activation parameter in view of a circuit load pattern during a long period, wherein the circuit load pattern represents previous load levels or variations;
      determine at least one short-term activation parameter in response to an expected or detected short period load change of the circuit, wherein the at least one short-term activation parameter includes a short-term voltage/frequency increment point and a short-term voltage/frequency decrement point during a short-term that corresponds to an execution period of a task;
      determine, in response to the at least one long-term activation parameter and in response to a short-term supply parameter, a clock signal frequency and a supply voltage level provided by the clock signal source and by the voltage source; and determine a short-term voltage/frequency alteration point and determine a conditional voltage/frequency alteration point in which a voltage/frequency alteration is responsive to the load of the circuit based on the conditional voltage/frequency alteration point.

10. The system according to claim 9 wherein the power management apparatus is adapted to determine the short-term voltage/frequency alteration point in synchronization with an expected short-term circuit load change.

11. The system according to claim 9 wherein the power management apparatus is adapted to determine multiple short-term voltage/frequency alteration points during the short-term that corresponds to an expected execution period of the task.

12. The system according to claim 9 wherein the power management apparatus is adapted to determine the short-term voltage/frequency increment point and the short-term voltage/frequency decrement point during the short-term that corresponds to an execution period of the task.

13. The system according to claim 9 wherein the power management apparatus is adapted to determine multiple short-term voltage/frequency alteration points and at least one conditional voltage/frequency alteration point during a short-term that corresponds to an expected execution period of the task.

14. The system according to claim 9 wherein the power management apparatus is adapted to determine a long period that is at least ten times longer than the short period.

15. The system according to claim 9 wherein the power management apparatus is adapted to predict an expected short period load change of the circuit in response to a signal or a command indicative of an initialization of a task.

16. The system according to claim 9 wherein the power management apparatus is adapted to predict an expected short period load change of the circuit in response to previous short-term load changes.

17. The system according to claim 9 wherein the power management apparatus comprises a hardware module adapted to determine the clock signal frequency and the supply voltage level, and also comprises a software module adapted to controlling the clock source and the voltage source.

18. A method for power management, the method comprise:

receiving an indication about a load of a circuit;

determining at least one long-term activation parameter in view of a circuit load pattern during at least one long period, wherein the circuit load pattern represents previous load levels or variations;

determining at least one short-term activation parameter in response to an expected or detected short period load change of the circuit, wherein the at least one short-term activation parameter includes a short-term voltage/frequency increment point and a short-term voltage/frequency decrement point during a short-term that corresponds to an execution period of a task;

providing at least one clock signal and at least one supply voltage in response to the long-term activation parameter and in response to the short-term supply parameter; and determining a short-term voltage/frequency alteration point and determining a conditional voltage/frequency alteration point in which a voltage/frequency alteration is responsive to the load of the circuit based on the conditional voltage/frequency alteration point.

* * * * *